United States Patent [19]
Helbawi

[11] Patent Number: 5,266,743
[45] Date of Patent: Nov. 30, 1993

[54] SEAL FOR AN ELECTRIC CABLE HAVING AN INSULATING SHEATH WRAPPED BY EXPOSED ELECTRICAL CONDUCTORS AND METHOD FOR SEALING THE ELECTRIC CABLE TO A SURROUNDING ENCLOSURE

[76] Inventor: Salah Helbawi, 49 Crescent de la Moselle, St-Lambert, Quebec, Canada, J4S 1W1

[21] Appl. No.: 854,212

[22] Filed: Mar. 20, 1992

[51] Int. Cl.$^5$ .................... H02G 15/04; H02G 1/00
[52] U.S. Cl. ........................ 174/93; 156/49; 174/74 A; 174/77 R
[58] Field of Search ............ 174/77 R, 80, 74 R, 174/74 A, 92, 93, 80, 96; 156/49

[56] References Cited

U.S. PATENT DOCUMENTS

| | | | |
|---|---|---|---|
| 3,655,907 | 4/1972 | Philibert et al. | 174/77 R |
| 4,622,436 | 11/1986 | Kinnan | 174/77 R |
| 4,723,055 | 2/1988 | Bisker | 174/77 R |
| 4,742,181 | 5/1988 | Dienes | 174/16 R |
| 4,886,939 | 12/1989 | Kinnan | 174/77 R |
| 5,007,701 | 4/1991 | Roberts | 174/77 R X |

FOREIGN PATENT DOCUMENTS 2743937  4/1979  Fed. Rep. of Germany ........ 174/93

OTHER PUBLICATIONS

JMS Triplex Duct Plugs for Concentric Neutral Cables, Jackmoon U.S.A., Inc., Cat. TC 19107.

Primary Examiner—Morris H. Nimmo
Attorney, Agent, or Firm—Ratner & Prestia

[57] ABSTRACT

Sealing member for an electric cable having an outer relief surface formed by an array of electrical conductors in a spaced apart relationship concentrically laid over an insulating sheath of the electric cable. The sealing member comprises a collar of flexible and resilient material including a plurality of elongated cavities spaced apart by a distance corresponding substantially to a spacing between electrical conductors of the array, and an outer sealing surface of a generally cylindrical configuration. The collar engages the electric cable concentrically, whereby electrical conductors of the array are caused to enter into respective cavities of the collar which is capable of forming a non-leaking union between the electric cable and an adjacent body in a mating relationship with the collar. The invention also extends to a sealing assembly to form a fluid-tight seal between the electric cable and a surrounding enclosure. The invention further extends to a method for sealing the electric cable to the surrounding enclosure.

40 Claims, 7 Drawing Sheets

SEAL FOR AN ELECTRIC CABLE HAVING AN INSULATING SHEATH WRAPPED BY EXPOSED ELECTRICAL CONDUCTORS AND METHOD FOR SEALING THE ELECTRIC CABLE TO A SURROUNDING ENCLOSURE

FIELD OF THE INVENTION

The invention relates to the general field of electrical equipment and, more particularly, to a novel seal for use with an electric cable having an outer relief surface formed by an array of electrical conductors laid concentrically over the insulating sheath of the cable. The invention also extends to a method for sealing the electric cable to an enclosure, such as a cable conduit.

BACKGROUND OF THE INVENTION

High power electric cables in underground installations are normally laid into protective conduits. In some instances, ground water may seep within the protective conduit which acts as a channel allowing the water to infiltrate underground enclosures containing sensitive electric equipment to which the protective conduit leads. To prevent such infiltration, a fluid-tight seal is formed at terminal points of the protective conduit, for example, where the conduit enters the underground enclosure. The fluid-tight seal is achieved by inserting in the end portion of the conduit a resilient plug of elastomeric material provided with bores through which the cables laid in the conduit can pass. By compressing the resilient plug, the latter is caused to expand and sealingly engage the inner surface of the conduit and the insulating sheaths of the cables, thereby forming the fluid-tight seal.

This seal is particularly effective with smooth surfaced cables having a generally circular cross sectional shape. However, in some type of installations, electric cables having an outer relief surface are being employed which cannot be sealed by the method used with ordinary smooth surfaced cables. The relief surface of the cable is formed by an array of electrical conductors, forming the neutral connection in a three-phase system for example, concentrically laid in a spaced apart relationship on the insulating sheath of the cable which surrounds the central core conductor. The traditional sealing methods are not suitable to this cable structure mainly because of the inability of the resilient plug to closely conform to the relief surface of the cable even when subjected to high compressive loads.

Attempts to solve this problem by injecting between the resilient plug and the relief surface of the cable paste-like sealing compounds, such as silicone or epoxy based products, have not met with success because the sealing compound has a tendency to harden and crack and is therefore unable to maintain a non-leaking union over long time periods.

OBJECTS AND STATEMENT OF THE INVENTION

An object of the invention is a sealing member for use with an electric cable having an outer relief surface formed by an array of electrical conductors concentrically laid over an insulating sheath of the electric cable, allowing to form a long-lasting seal between the cable and an adjacent body such as a conventional resilient plug used to seal smooth surfaced electric cables.

Another object of the invention is a sealing assembly to form a durable, fluid-tight seal between an electric cable having an outer relief surface formed by an array of electrical conductors concentrically laid over an insulating sheath of the cable, and an enclosure surrounding the electric cable such as a protective conduit.

Another object of the invention is a method for sealing an electrical cable having an outer relief surface formed by an array of electrical conductors concentrically laid on an insulating sheath of the cable, to an enclosure surrounding the electric cable such as a protective conduit.

As embodied and broadly described herein, the invention provides a sealing member for an electric cable having an outer relief surface formed by an array of electrical conductors concentrically laid over an insulating sheath of said electric cable, said electrical conductors being in a spaced apart relationship and defining recesses therebetween, said sealing member comprising a collar of flexible and resilient material including:

a plurality of elongated cavities spaced apart by a distance corresponding substantially to a spacing between electrical conductors of said array; and an outer sealing surface of a generally cylindrical configuration, said collar being capable of engaging said electric cable concentrically, whereby electrical conductors of said array are caused to enter into respective cavities of said collar which obturates said recesses and is capable of forming a non-leaking union between said electric cable and an adjacent body in a mating relationship with said collar.

By applying the collar on the electric cable, the surface of the cable is rendered locally generally cylindrical, whereby a conventional compressible plug of resilient material can be used in order to complete the seal with the enclosure in which the cable is laid. In a preferred embodiment, the collar is formed on the electric cable by wrapping thereon a strip of resilient material whose extremities meet in an abutting relationship. This embodiment is particularly advantageous allowing to install the seal member without the necessity of cutting or disconnecting the cable from associated equipment in order to free an end of the cable. The elongated conductor receiving cavities are longitudinally open at the inner surface of the strip whereby the individual conductors are engaged into respective cavities by pressing the strip against the cable.

In a preferred embodiment, each cavity of the sealing strip has a longitudinally extending entry zone opening at the inner surface of the strip. The entry zone includes a pair of opposing walls in a spaced apart relationship defining therebetween an entry passage for an electrical conductor. When the collar formed by the strip wrapped on the cable is compressed by the resilient plug subjected itself to compression to establish the fluid-tight seal, the opposing walls of the entry passage meet in an abutting relationship, whereby entirely closing the cavity around the electrical conductor for a better seal.

As embodied and broadly described herein, the invention also provides a sealing member for an electric cable having an outer relief surface formed by an array of electrical conductors concentrically laid over an insulating sheath of said electric cable, said electrical conductors being in a spaced apart relationship and defining recesses therebetween, said sealing member comprising an elongated strip of flexible and resilient material, including:

a plurality of elongated grooves spaced apart by a distance corresponding substantially to a spacing between electrical conductors of said array, said grooves having longitudinally extending entry openings on an inner surface of said strip; and an outer sealing surface, said strip being capable of engaging said electric cable in a wrapping relationship therewith, to form a collar on said electric cable having a peripheral surface formed by said outer sealing surface, whereby electrical conductors of said array are caused to enter into respective grooves of said strip which obturates said recesses and is capable to establish a non-leaking union between said electric cable and an adjacent body in a mating relationship with said collar.

As embodied and broadly described herein, the invention provides a sealing member for an electric cable having an outer relief surface formed by an array of electrical conductors in a spaced apart relationship concentrically laid on an insulating sheath of said electric cable, said sealing member comprising a collar of flexible and resilient material having an outer sealing surface of a generally cylindrical configuration and an inner relief surface complementary to said outer relief surface, said collar being capable of engaging said electric cable concentrically to cause said relief surfaces to mate in a sealing relationship, whereby said collar can form a non-leaking union between said outer relief surface and an adjacent body sealingly engaging said outer sealing surface.

As embodied and broadly described herein, the invention further provides a sealing assembly to form a fluid-tight seal between an electric cable and an enclosure substantially surrounding said electric cable, said electric cable having an outer relief surface formed by an array of electrical conductors concentrically laid over an insulating sheath of said electric cable, said electrical conductors being in a spaced apart relationship and defining recesses therebetween, said sealing assembly comprising:

an outer seal member for sealingly engaging said enclosure;

an inner seal member mating with said outer seal member, said inner seal member including a collar of flexible and resilient material, comprising:

a plurality of elongated cavities spaced apart by a distance corresponding substantially to a spacing between electrical conductors of said array; and an outer sealing surface, said collar being capable of engaging said electric cable concentrically, whereby electrical conductors of said array are caused to enter into respective cavities of said collar which obturates said recesses and is capable of forming a non-leaking union between said electric cable and said outer seal member.

In a most preferred embodiment, the outer seal member is slit from an outer surface thereof up to a bore for accepting the electric cable in order to facilitate the installation of the outer seal member on the cable. The outer seal member is manually distorted to open wide the slit and allow cable to be inserted in the bore through the slit. When the deformation effort is discontinued, the outer seal member returns to its original configuration and closes on the cable. This feature does not require the cable to be cut or otherwise disconnected from associated equipment in order to free an end of the cable to be slipped through the bore of the outer seal member.

As embodied and broadly described herein, the invention further provides a method for sealing an electric cable to an enclosure, said electric cable having an outer relief surface formed by an array of electrical conductors concentrically laid over an insulating sheath of said electric cable, said electrical conductors being in a spaced apart relationship and defining recesses therebetween, said method comprising the steps of:

providing a collar of flexible and resilient material, including:

a) a plurality of elongated cavities spaced apart by a distance corresponding substantially to a spacing between electrical conductors of said array; and b) an outer sealing surface of a generally cylindrical configuration;

applying said collar concentrically on said electric cable, whereby electrical conductors are caused to enter into respective cavities of said collar which obturates said recesses;

obturating a space defined between an outer surface of said collar and said enclosure.

DESCRIPTION OF A PREFERRED EMBODIMENT

Figure 1:
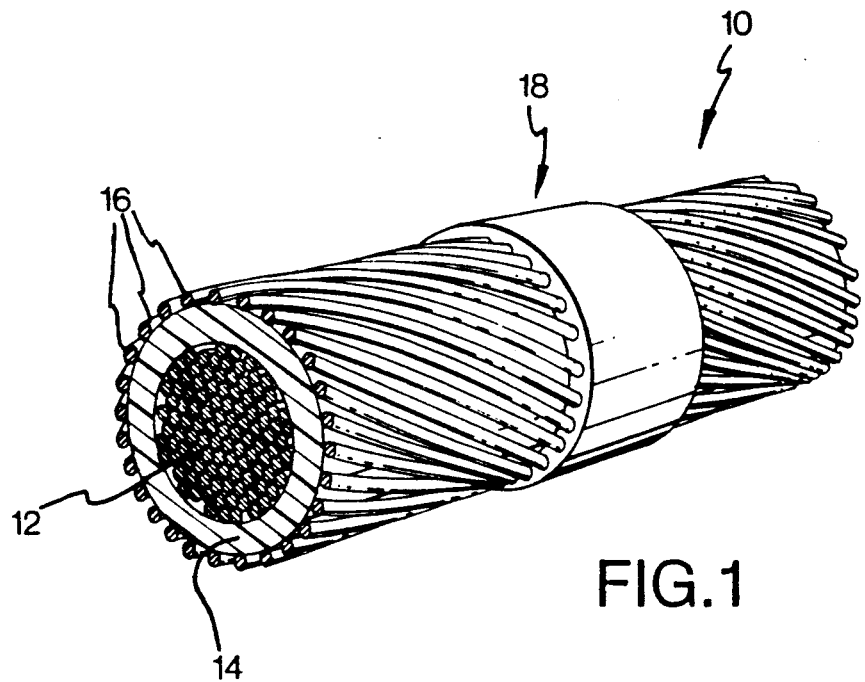
FIG. 1 is a perspective view of an electric cable with exposed electrical conductors concentrically laid on the insulating sheath of the cable, on which is engaged a sealing member in accordance with the invention.

FIG. 1 illustrates an electric cable, designated comprehensively by the reference numeral 10, of the type frequently used in multi-phase high power electric installation. The cable 10 comprises a central conductor core 12 made from a plurality of copper or aluminum strands surrounded by a polymeric insulating sheath 14. An array of spirally extending conductors 16 is concentrically laid on the sheath 14. In a three-phase system, the conductors 16 form the neutral connection of the network.

In order to form a fluid-tight seal between the outer relief surface of the cable 10 and a surrounding enclosure, such as a protective cable conduit, the present invention provides a seal member 18 which conforms to the irregular outer surface of the cable 10 to provide a smooth sealing surface, preferably of a generally cylindrical configuration which can be mated to conventional seals designed for use with electric cables having a perfectly circular cross-sectional shape.

The seal member 18 is an elongated strip of resilient and flexible material, such as polyurethane, silicone or a thermoplastic material, and comprises a plurality of transversely extending grooves or cavities 20 forming continuous channels extending from one longitudinal edge of the seal member 18 to the other longitudinal edge thereof. Each groove 20 has a generally circular cross-sectional shape, of a diameter corresponding approximately to the diameter of an electrical conductor 16, and communicates with the inner surface 22 of the seal member 18 through a channel 24 extending the entire length of the groove 20. The channel 24 is defined between a pair of opposing walls 26 and has a width substantially less than the maximum transverse dimension of the groove 20. In the example shown, the maximum transverse dimension corresponds to the diameter of the groove.

Figure 2:
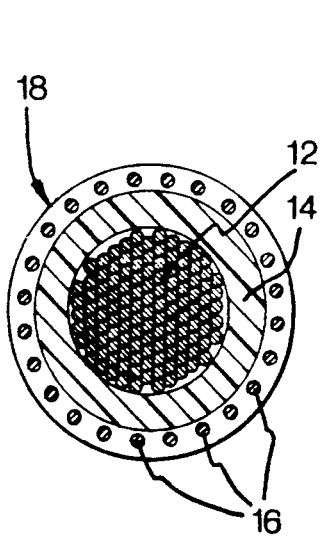
FIG. 2 is an end elevational view of the cable shown in FIG. 1.
Figure 3:
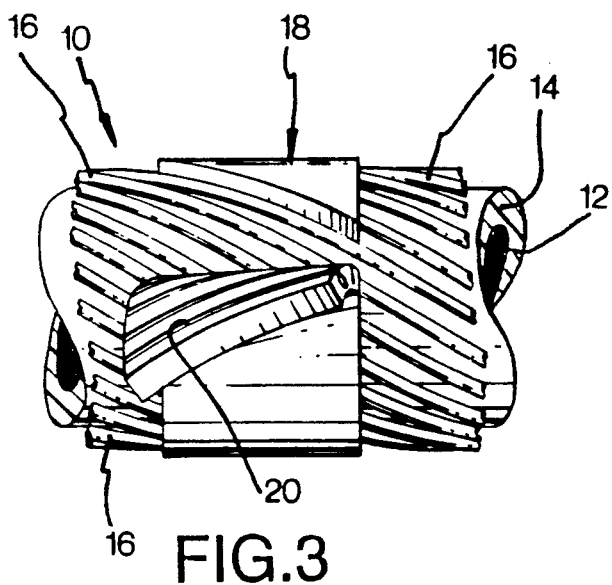
FIG. 3 is a side elevational view of the cable shown in FIG. 1, the sealing member being partially detached from the cable surface.
Figure 4:
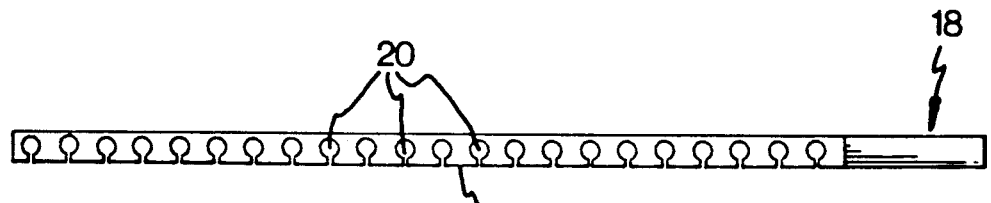
FIG. 4 is a side elevational view of the sealing member constructed in accordance with the invention.
Figure 5:
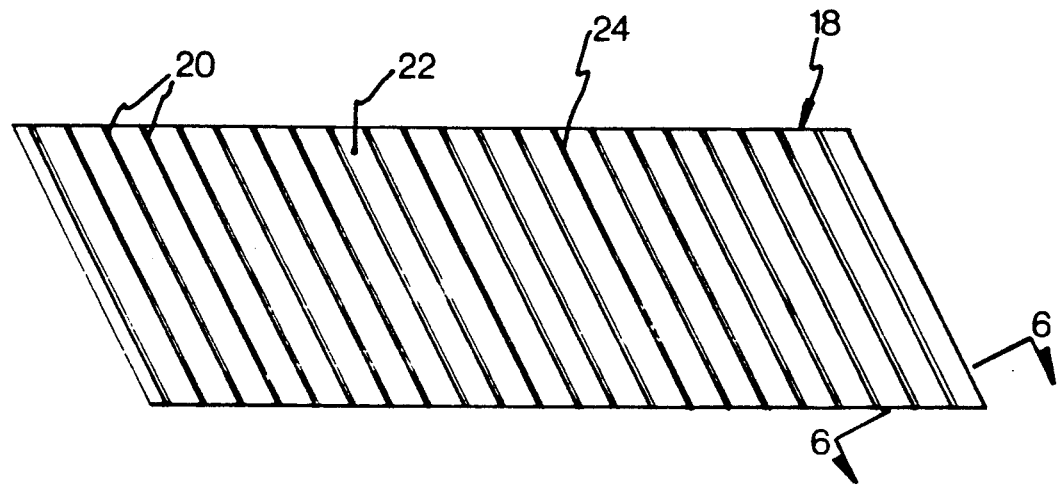
FIG. 5 is a plan view of the inner surface of the sealing member shown in FIG. 4.
Figure 6:
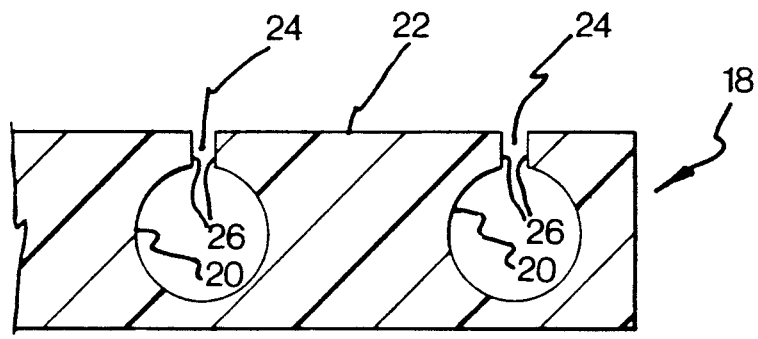
FIG. 6 is a highly enlarged cross-sectional view taken along lines 6—6 of FIG. 5.
Figure 7:
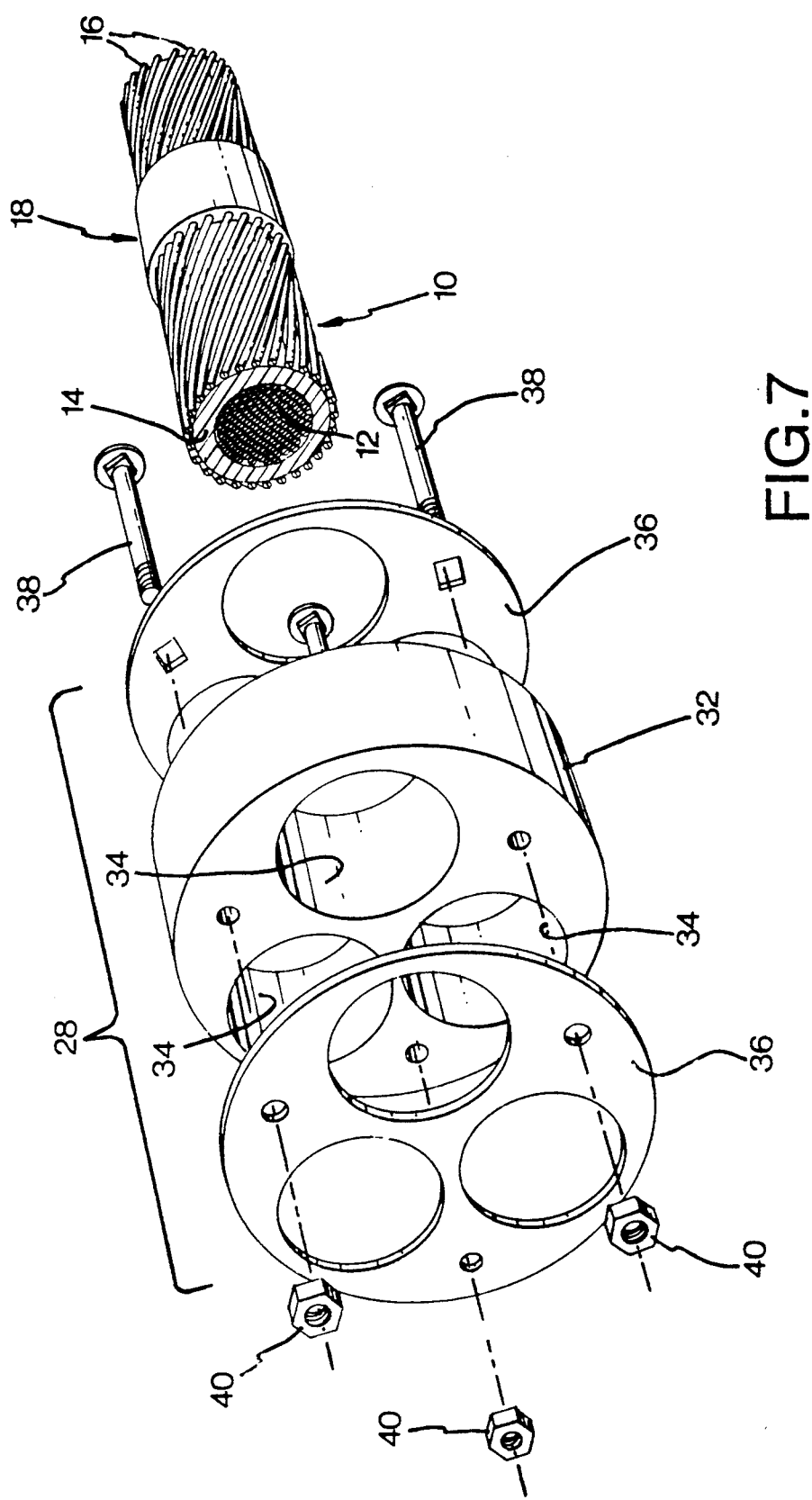
FIG. 7 is a perspective exploded view of a sealing assembly to form a non-leaking union between the cable shown in FIG. 1 and a surrounding enclosure, such as a cable conduit.

The spacing between the grooves 20 corresponds to the distance between adjacent electrical conductors 16. Accordingly, the strip forming the seal member 18 can be wrapped on the cable 10, as shown in FIGS. 1, 2 and 3, whereby the electrical conductors 16 enter into respective grooves 20 through the elongated passages 24 on the inner surface 22 of the strip. To cause the electrical conductor 16 to enter the respective grooves 20, the application of firm manual pressure is required to distort the resilient material and spread apart the opposing walls 26 by a distance sufficient to allow the electrical conductors 16 to penetrate in the grooves 20. Once the conductors 16 slide past through the respective passages 24, the opposing walls 26 return to their original spacing, thereby preventing an unwanted removal of the strip from the cable 10

It will be appreciated that the grooves 20 extend obliquely with respect to a longitudinal axis of the strip, (also the grooves 20 extend obliquely with respect to the longitudinal axis of the strip in collar form) in order to geometrically interrelate with the helically extending electrical conductors 16, whereby the strip in a wrapped condition on the cable 10 forms a collar of a perfectly circular configuration extending perpendicularly to the longitudinal axis of the cable 10, the ends of the strip meeting in an abutting relationship. Of course, the length of the strip must be selected to match the circumference of the cable 10.

Figure 8:
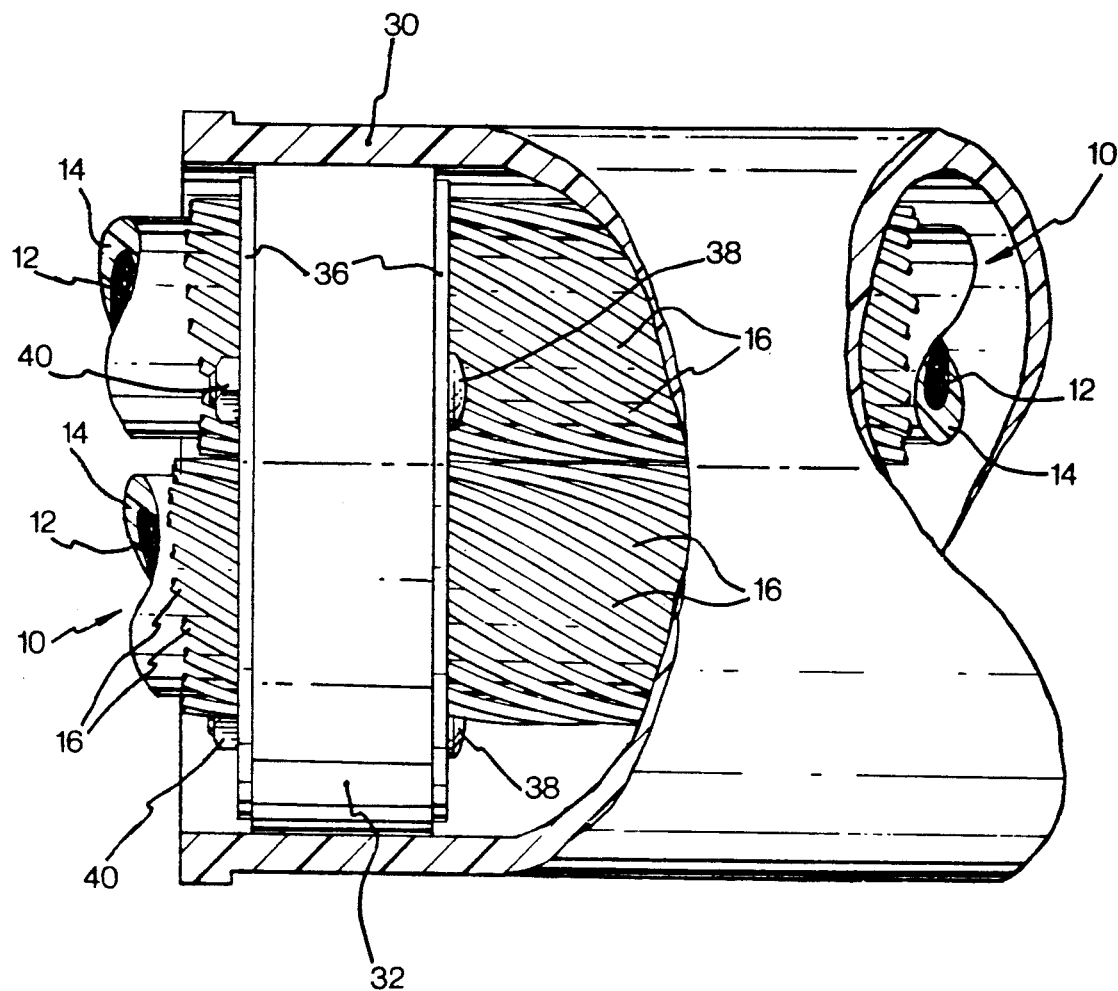
FIG. 8 is a side elevational fragmentary view of the sealing assembly shown in FIG. 7 mounted within a cable conduit.
Figure 9:
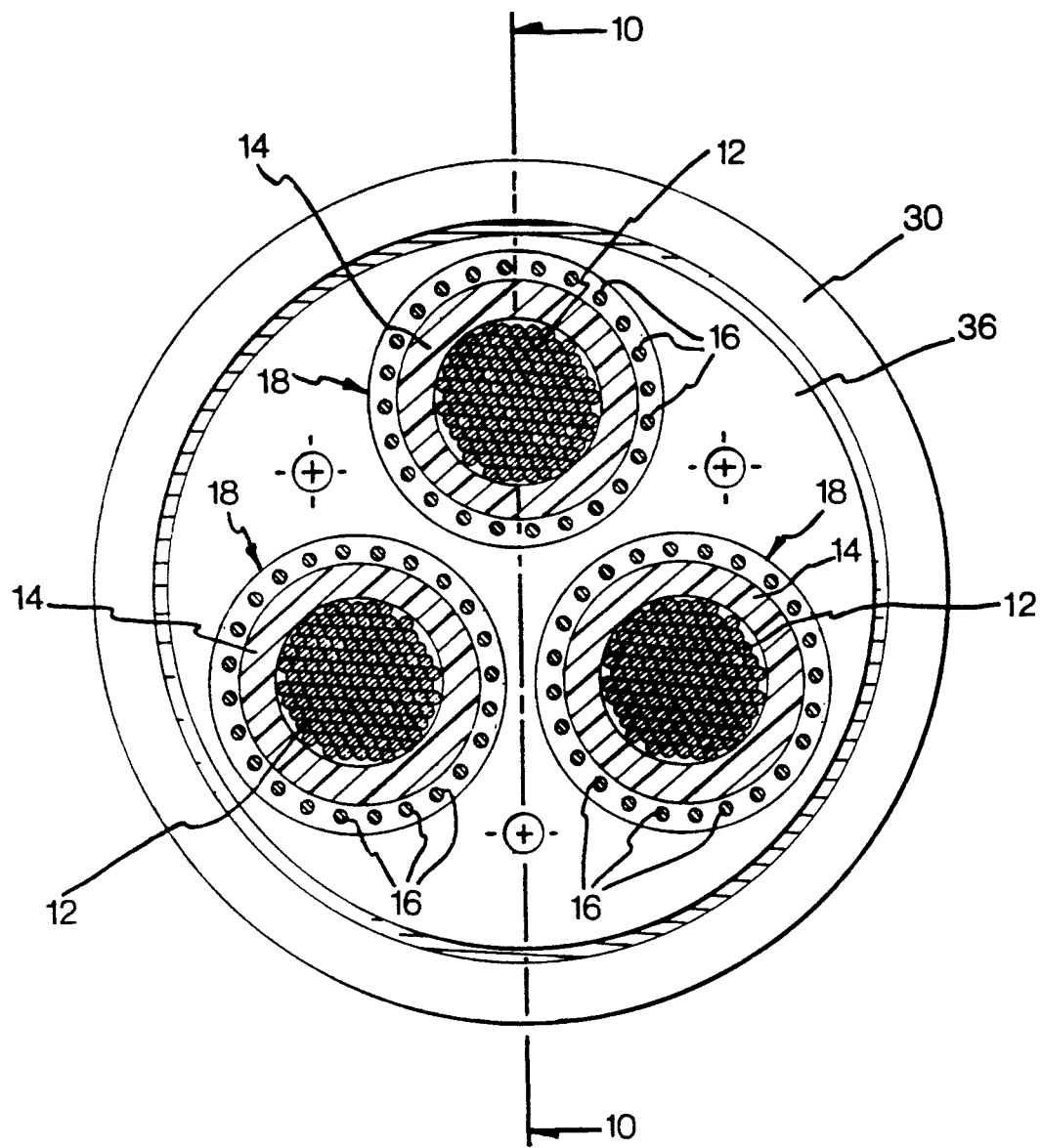
FIG. 9 is an elevational end view of the sealing assembly and the enclosure shown in FIG. 8.
Figure 10:
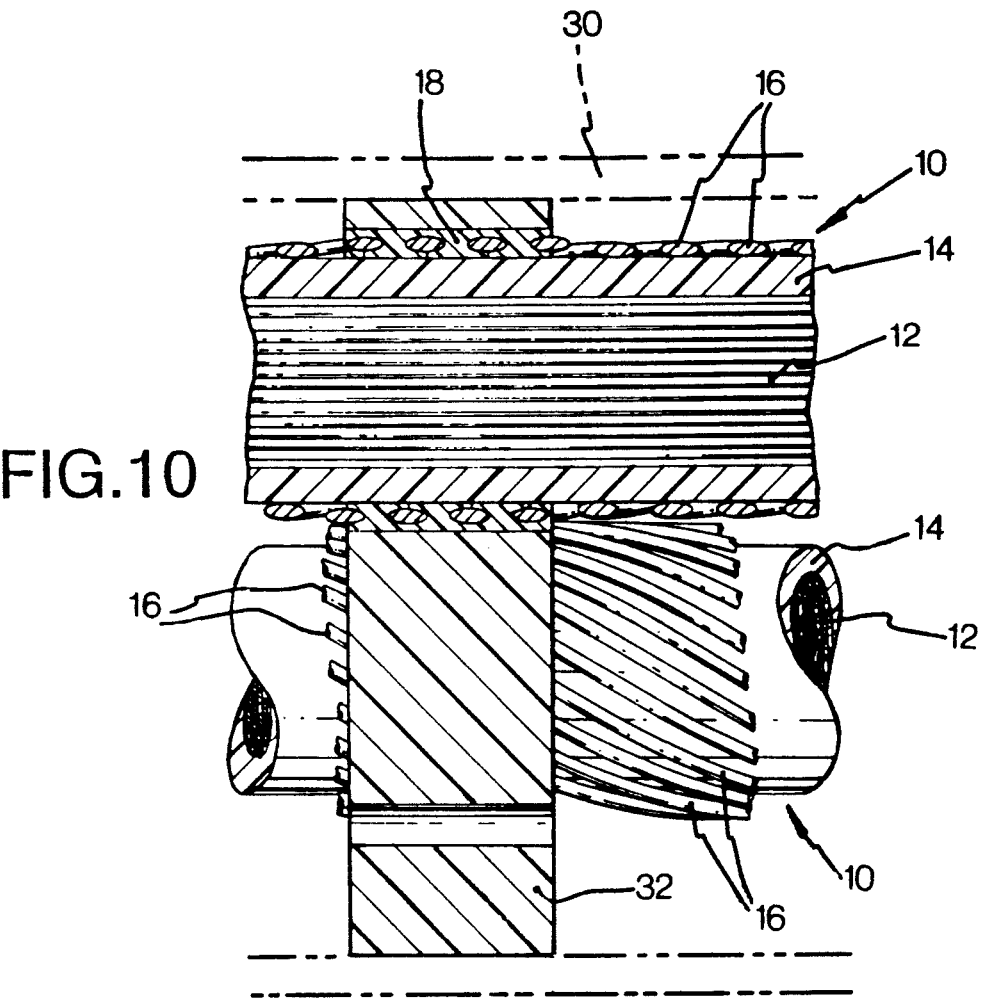
FIG. 10 is a cross-sectional view taken along lines 10—10 in FIG. 9.

With reference to FIGS. 7 to 12, the cable 10 with the seal member 18 can be mated to a conventional sealing plug assembly 28 to form a fluid tight-seal between the outer surface of the seal member 18 and an enclosure surrounding the cable such as a cable conduit 30 shown in FIGS. 8 and 9. The sealing plug assembly 28 comprises a plug 32 of flexible and resilient material, such as polyurethane, closely conforming to the shape of the enclosure, for instance having a circular configuration.

The plug 32 is provided with a trio of bores 34 to receive three cables. It should be appreciated that the number of bores through the plug 32 is a matter of design and depends on the number of cables that are to be sealed to the enclosure.

The plug 32 is mounted between a pair of metallic plates 36 which have a shape corresponding to the shape of the plug 32. Three bolts 38 extend through the plates 36 and through the plug 32 and engage with nuts 40. In a preferred embodiment, the bolts 38 are provided with square bosses under the bolt heads from which project the threaded shanks. The square bosses fit into closely conforming holes in the plate 36 against which lie the bolt heads in order to provide a non-rotating engagement. As a result, the bolts 38 are locked against rotation when the nuts 40 are being tightened.

The method for sealing the cable 10 to the cable conduit 30 is best illustrated in FIGS. 8 to 12. In practice, the conduit 30 is dimensioned to hold three cables 10 forming a three-phase network. The first step in the sealing operation consists of wrapping on each cable 10 the grooved strip to form the seal member 18 which locally provides the cable with a smooth cylindrical outer surface. The next step consists of slipping on the cables 10 the plates 36 and the sealing plug 32 to fit them over the previously installed sealing collars 18. In order to carry out this operation, the cables 10 must either be cut or disconnected from associated equipment in order to free cable ends that can be slipped through the plates 36 and the resilient plug 32. The thus formed sealing assembly is usually located near the opening of the cable conduit 30 in order to make the nuts 40 easily accessible from the outside.

Figure 11:
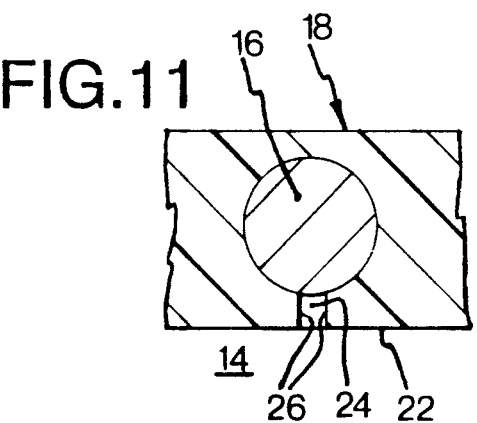
FIG. 11 is a highly enlarged fragmentary view of the sealing member in accordance with the invention receiving an electrical conductor and shown in a relaxed or uncompressed condition.
Figure 12:
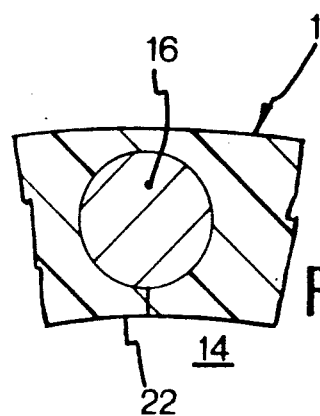
FIG. 12 illustrates the sealing member of FIG. 11 in a compressed condition.

At last, the nuts 40 are tightened in order to draw the plates 36 closer to one another and compress the resilient plug 32. As a result of this compression, the resilient plug 32 expands radially inwardly and outwardly. The outward compression causes the peripheral surface of the plug to sealingly engage the inner surface of the cable conduit 30 and establish therewith a fluid-tight seal. The inward expansion causes the diameter of the bores 34 to diminish for, in turn, compressing the individual sealing members 18. The compression of the collars 18 allows, firstly, to create a fluid-tight seal between the outer sealing surface of the collars and the inner surfaces of the bores 34. Secondly, the opposite sidewalls 26 of the passages 24 are caused to abut against each other in order to individually seal each electrical conductor 16 and in addition, form a fluid-tight seal between the inner surfaces 22 of the collars and the insulating sheath 14. Thirdly, the abutting end portions of the strips forming the collars 18 are firmly brought against each other for a better seal. This feature is best shown in FIGS. 11 and 12.

Figure 14:
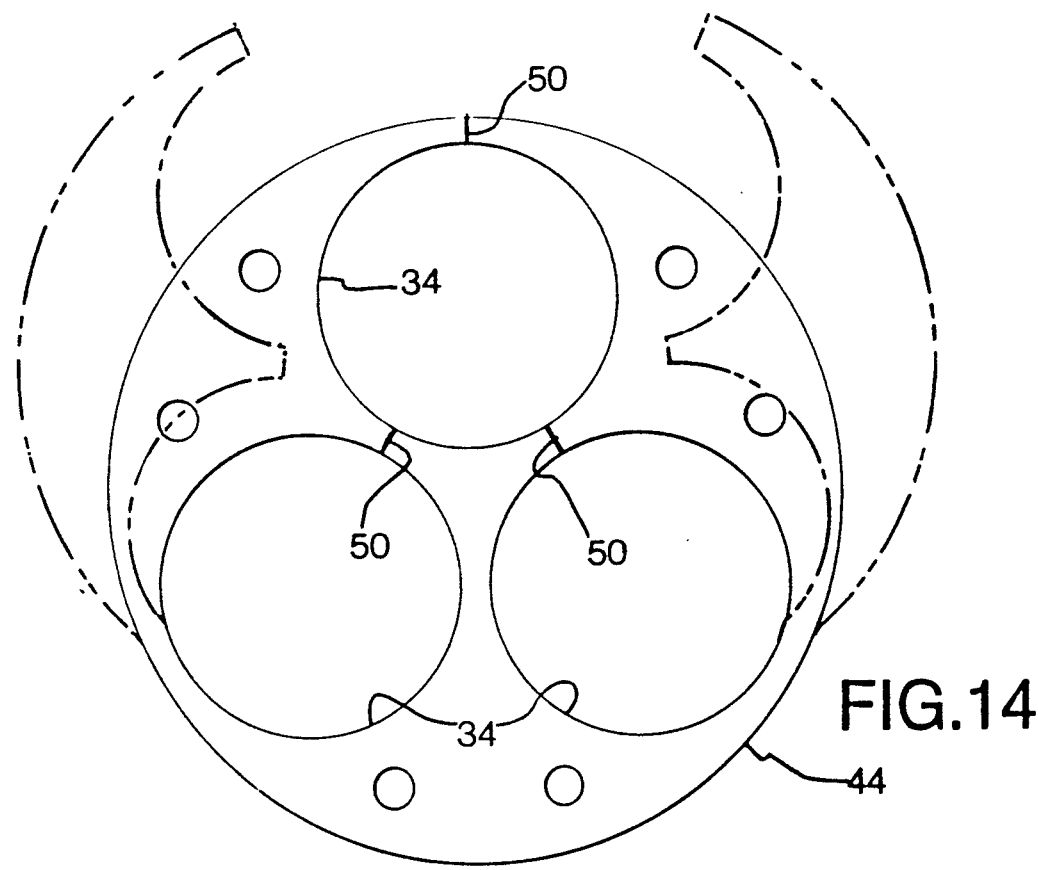
FIG. 14 is a front elevational view of the sealing plug showing same in a closed and in an opened position.
Figure 13:
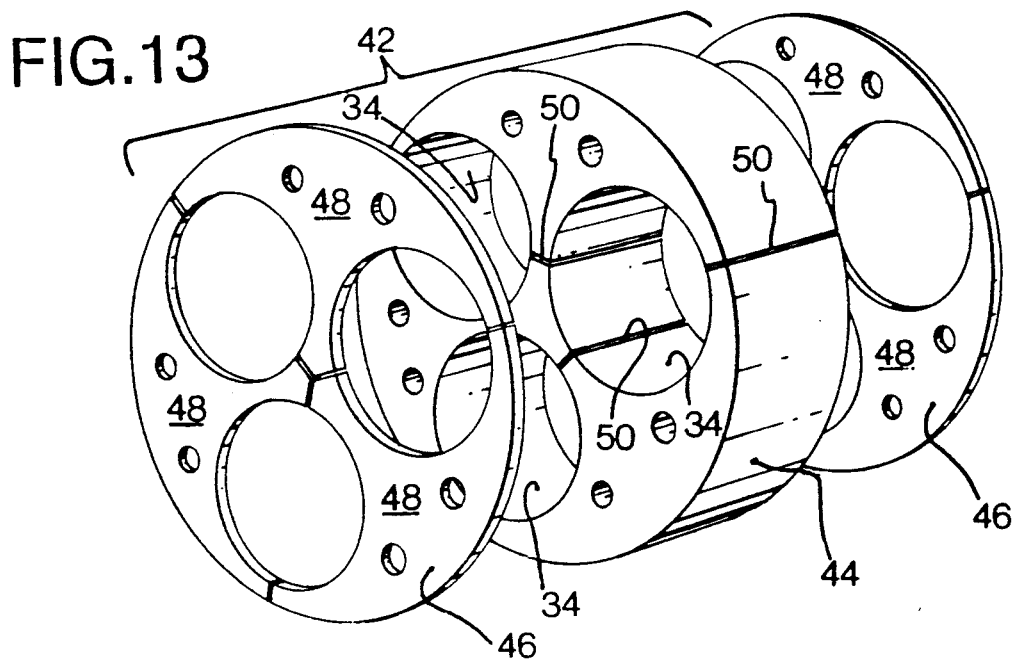
FIG. 13 is a perspective exploded view of a variant of a sealing plug used to form a non-leaking union between a cable and a enclosure.

FIGS. 13 and 14 illustrate a Variant of the seal assembly 28 which is designed in such a way as to be installed on a cable trio without necessitating to cut or disconnect the cables from associated equipment. The seal assembly designated by the reference numeral 42 comprises a modified resilient plug 44 mounted between compressing plates 46 each formed of three identical segments 48.

The difference between the resilient plugs 44 and 32 resides in the provision on the plug 44 of three slits 50 creating discontinuities in the walls defining the bores 34 which enable the plug 44 to be manually distorted, as shown in dashed lines in FIG. 14, whereby the sealing plug 44 can be laterally applied on the cables.

The configuration of the segments 48 is such that the plates 46 can be assembled around the cables 10. For a better stability, a larger number of compression bolts is being used, six for instance, in order to spread the compression forces over a larger surface of the plates 46.

The above description is provided only as an example of the present invention and should not be construed in any limiting manner as variants and refinements are possible without departing from the spirit of the invention. The scope of the invention is defined in the appended claims and their equivalents.

I claim:

1. A sealing member for an electric cable having an outer relief surface formed by an array of electrical conductors concentrically laid on an insulating sheath of said electric cable, said electrical conductors being in a spaced apart relationship and defining recesses therebetween, said sealing member comprising a collar of flexible and resilient material including:
   a plurality of elongated cavities spaced apart by a distance corresponding substantially to a spacing between electrical conductors of an array of electrical conductors; and
   an outer sealing surface of a generally cylindrical configuration, said collar being capable of engaging said electric cable concentrically, whereby electrical conductors of said array are capable of entering into respective cavities of said collar which obturates said recesses and is capable of forming a non-leaking union between said electric cable and an adjacent body in a mating relationship with said collar.

2. A sealing member as defined in claim 1, wherein said cavities have open ends.

3. A sealing member as defined in claim 1, wherein said cavities open at an inner surface of said collar, whereby said electrical conductors are capable of penetrating laterally into said cavities.

4. A sealing member as defined in claim 3, wherein each cavity has a longitudinally extending entry zone opening at said inner surface, said entry zone including a pair of opposing walls in a spaced apart relationship defining therebetween an entry passage for an electrical conductor, compression of said collar causing said opposing walls to meet in an abutting relationship, whereby closing the cavity around the electrical conductor therein.

5. A sealing member as defined in claim 4, wherein said entry passage has a width less than a maximum transverse dimension of the cavity.

6. A sealing member as defined in claim 1, wherein said cavities have a generally circular cross-sectional shape.

7. A sealing member as defined in claim 1, wherein said cavities extend obliquely with respect to a longitudinal axis of said collar.

8. A sealing member as defined in claim 1, wherein said resilient and flexible material is selected from the group consisting of polyurethane, silicone and thermoplastic material.

9. A sealing member as defined in claim 1, wherein said cavities are generally parallel.

10. A sealing member for an electric cable having an outer relief surface formed by an array of electrical conductors concentrically laid on an insulating sheath of said electric cable, said electrical conductors being in a spaced apart relationship and defining recesses therebetween, said sealing member comprising an elongated strip of flexible and resilient material including:
    a plurality of elongated grooves spaced apart by a distance corresponding substantially to a spacing between electrical conductors of an array of electrical conductors, said grooves having longitudinally extending entry openings on an inner surface of said strip; and
    an outer sealing surface, said strip being capable of engaging said electric cable in a wrapping relationship, to form a collar on said electric cable having a peripheral surface of a generally cylindrical configuration formed by said outer sealing surface, whereby electrical conductors of said array are capable of entering into respective grooves of said strip which obturates said recesses and is capable to establish a non-leaking union between said electric cable and an adjacent body in a mating relationship with said collar.

11. A sealing member as defined in claim 10, wherein said grooves have open ends.

12. A sealing member as defined in claim 10, wherein each groove has a longitudinally extending entry zone opening at said inner surface, said entry zone including a pair of opposing walls in a spaced apart relationship defining therebetween an entry passage for an electrical conductor, compression of said collar causing said opposing walls to meet in an abutting relationship whereby fully closing the groove around the electrical conductor therein.

13. A sealing member as defined in claim 12, wherein said entry passage has a width less than a maximum transverse dimension of said cavity.

14. A sealing member as defined in claim 10, wherein said grooves have a generally circular cross-sectional shape.

15. A sealing member as defined in claim 10, wherein said grooves extend obliquely with respect to a longitudinal axis of said strip.

16. A sealing member as defined in claim 10, wherein extremities of said strip meet in an abutting relationship when said strip is wrapped on said electric cable to form said collar.

17. A sealing strip as defined in claim 10, wherein said grooves are generally parallel.

18. A sealing member for an electric cable having an outer relief surface formed by an array of electrical conductors in a spaced apart relationship concentrically laid on an insulating sheath of said electric cable, said sealing member comprising a collar of flexible and resilient material having an outer sealing surface of a generally cylindrical configuration and an inner relief surface complementary to an outer relief surface of an electric cable, said collar being capable of engaging said electric cable concentrically to cause said relief surfaces to mate in a sealing relationship, whereby said collar can form a non-leaking union between said outer relief surface and an adjacent body sealingly engaging said outer sealing surface.

19. A sealing member as defined in claim 18, wherein said inner relief surface comprises a plurality of elongated grooves for receiving respective electrical conductors of said array.

20. A sealing member as defined in claim 19, wherein said grooves are generally parallel.

21. A sealing member as defined in claim 19, wherein said grooves extend obliquely with respect to a longitudinal axis of said collar.

22. A sealing member as defined in claim 18, comprising an elongated strip of said flexible and resilient material having extremities in an abutting relationship to form said collar.

23. A sealing assembly to form a fluid-tight seal between an electric cable and an enclosure substantially surrounding said electric cable, said electric cable having an outer relief surface formed by an array of electrical conductors concentrically laid on an insulating sheath of said electric cable, said electrical conductors being in a spaced apart relationship and defining recesses therebetween, said sealing assembly comprising:

- an outer seal member for sealingly engaging said enclosure;
- an inner seal member mating with said outer seal member, said inner seal member including a collar of flexible and resilient material comprising:
- a plurality of elongated cavities spaced apart by a distance corresponding substantially to a spacing between electrical conductors of an array of electrical conductors; and
- an outer sealing surface, said collar being capable of engaging said electric cable concentrically, whereby electrical conductors of said array are capable of entering into respective cavities of said collar which obturates said recesses and is capable of forming a non-leaking union between said electric cable and said outer seal member.

24. A sealing assembly as defined in claim 23, further comprising compressing means for compressing said outer seal member to cause expansion thereof against said enclosure and said inner seal member.

25. A sealing assembly as defined in claim 23, wherein said outer seal member comprises a body of flexible and resilient material having a generally cylindrical bore for receiving therein said collar and said electric cable.

26. A sealing assembly as defined in claim 23, wherein said body of flexible and resilient material comprises a plurality of cylindrical bores for receiving therein a plurality of electric cables.

27. A sealing assembly as defined in claim 24, wherein said compressing means comprises a pair of plates in a spaced apart relationship and means cooperating with said plates for urging said plates toward each other, said outer seal member being mounted between said plates which cause said outer seal member to expand by moving toward one another.

28. A sealing assembly as defined in claim 25, wherein said body of flexible and resilient material has a discontinuity extending from an outer surface of said body to said bore, whereby allowing said body to be distorted against its resiliency to open said bore at said discontinuity to allow an electrical cable to enter in said bore through said discontinuity.

29. A sealing assembly as defined in claim 23, wherein said cavities have open ends.

30. A sealing assembly as defined in claim 23, wherein said cavities open at an inner surface of said collar, whereby said electrical conductors are capable of entering laterally into said cavities 31. A sealing assembly as defined in claim 30, wherein each cavity has a longitudinally extending entry zone opening at said inner surface, said entry zone including a pair of opposing walls in a spaced apart relationship defining therebetween an entry passage for an electrical conductor, compression of said collar causing said opposing walls to meet in an abutting relationship whereby closing the cavity around the electrical conductor therein.

32. A sealing assembly as defined in claim 31, wherein said entry passage has a width less than a maximum transverse dimension of said cavity.

33. A sealing assembly as defined in claim 23, wherein said cavities have a generally circular cross-sectional shape.

34. A sealing assembly as defined in claim 23, wherein said cavities extend obliquely with respect to a longitudinal axis of said collar.

35. A sealing assembly as defined in claim 23, wherein said flexible and resilient material is selected from the group consisting of polyurethane, silicone and thermoplastic material.

36. A sealing assembly as defined in claim 23, wherein said cavities are generally parallel.

37. A method for sealing an electrical cable to an enclosure, said electric cable having an outer relief surface formed by an array of electrical conductors in a spaced apart relationship concentrically laid on an insulating sheath of said electric cable, said electrical conductors being in a spaced apart relationship and defining recesses therebetween, said method comprising the steps of:

providing a collar of flexible and resilient material, including:
- a) a plurality of elongate cavities spaced apart by a distance corresponding substantially to a spacing between electrical conductors of an array of electrical conductors; and
- b) an outer sealing surface of a generally cylindrical configuration;

applying said collar concentrically on said electric cable, whereby electrical conductors of said array of electrical conductors are capable of entering into respective cavities of said collar which obturates said recesses;

obturating a space defined between an outer surface of said collar and said enclosure.

38. A method as defined in claim 37, comprising the step of providing a strip of said flexible and resilient material comprising said cavities and wrapping said strip on said electric cable to form said collar.

39. A method as defined in claim 37, comprising the step of radially compressing said collar to establish a fluid tight seal between said collar and said electric cable.

40. A method as defined in claim 37, comprising the steps of applying on said collar a resilient outer seal member and expanding said outer seal member to establish a non-leaking union between said collar and said enclosure.

* * * * *